Nov. 16, 1937.  J. CALABRO  2,099,049
AUTOMOBILE BUMPER
Filed Nov. 28, 1936
Fig. 1
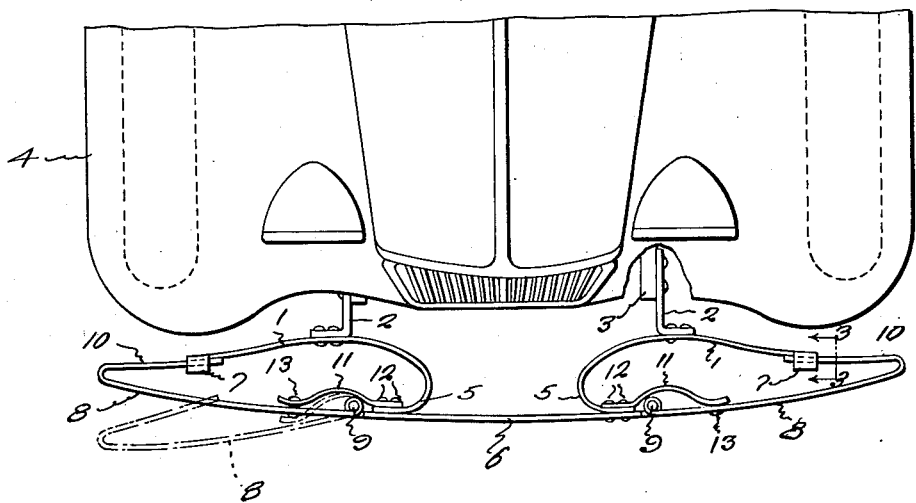
Fig. 2
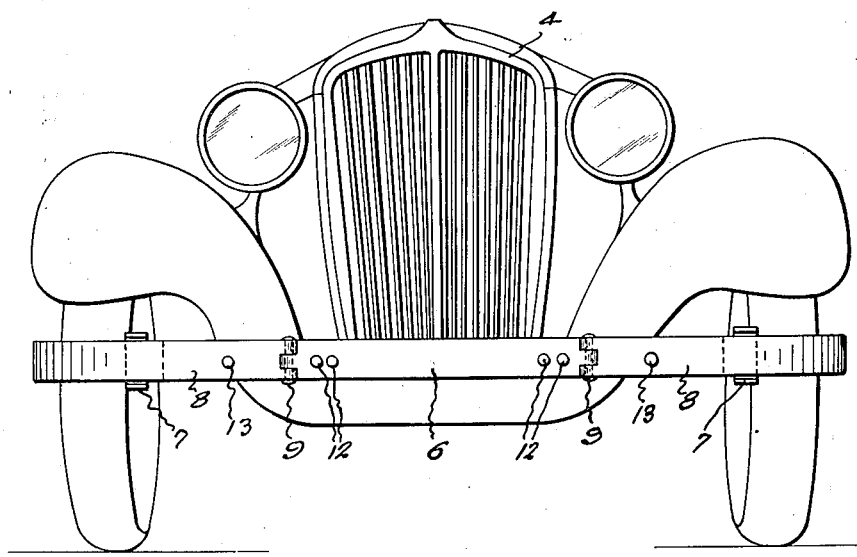
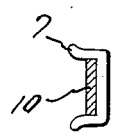
Fig. 3.
Inventor
Joseph Calabro
By Clarence A. O'Brien & Hyman Berman
Attorneys Patented Nov. 16, 1937

2,099,049

UNITED STATES PATENT OFFICE 2,099,049

AUTOMOBILE BUMPER

Joseph Calabro, Everett, Mass.

Application November 28, 1936, Serial No. 113,249

2 Claims. (Cl. 293—55)

The present invention relates to new and useful improvements in automobile bumpers and has for its primary object to provide, in a manner as hereinafter set forth, a device of this character embodying a novel construction, combination and arrangements of parts through the medium of which said bumper will automatically yield and disengage itself should another vehicle be fouled, as when backing into a parking space.

Another very important object of the invention is to provide a bumper of the aforementioned character wherein the movable parts will automatically return to normal position after they have disengaged themselves from the object which has been fouled, such as the bumper of another vehicle.

Other objects of the invention are to provide an automobile bumper of the character described which will be comparatively simple in construction, strong, durable, highly efficient and reliable in use, compact, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a top plan view of a bumper constructed in accordance with the present invention showing the same mounted on the front of an automobile.

Figure 2 is a view in front elevation.

Figure 3 is a detail view in vertical section, taken substantially on the line 3—3 of Figure 1.

Referring now to the drawing in detail, it will be seen that the embodiment of the invention which has been illustrated comprises a pair of curved supporting members 1 of suitable spring metal which are attached by brackets 2 to the frame 3 of an automobile 4. The members 1 include reversed inner end portions 5 to which the end portions of a bar 6, also of suitable spring metal, are secured. On the other end portions of the members 1 are substantially U-shaped guides 7 which are shown to advantage in Figure 3 of the drawing.

The reference numeral 8 designates end members which are hingedly connected at one end, as at 9, for swinging movement in a horizontal plane to the ends of the bar 6. The end members 8 comprise substantially reversed free end portions 10 which are adapted to seat in the guides 7. The swinging end members 8 are also of suitable spring metal. The reference numeral 11 designates springs which are rigidly secured at one end, as at 12, to the end portions 5 of the members 1. The springs 11 are secured at their other ends, as at 13, to the swinging end members 8.

It is thought that the operation of the invention will be readily apparent from a consideration of the foregoing. The springs 11 normally maintain the end members 8 in the position shown in full lines in Figure 1 of the drawing with the portions 10 of said end members engaged in the guides 7. However, should the end portions of the bumper foul another object, such as the bumper of another vehicle when backing into a parking space, the end members 8 will swing against the tension of their respective springs 11 in the manner suggested in broken lines in Figure 1 of the drawing until the object which has been fouled has been cleared. When this has been done the springs 11 immediately return the end members 8 to normal position.

It is believed that the many advantages of an automobile bumper constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. An automobile bumper comprising a pair of supporting members, means for attaching said supporting members to an automobile, a bar extending between said supporting members and secured thereto, substantially U-shaped guides on one end of the supporting members, end members hingedly connected, at one end, to the bar, the other ends of said end members being engageable in the guides, and springs connected to said end members for yieldingly urging the same into engagement with the guides.

2. An automobile bumper of the class described comprising a pair of supporting members including substantially reversed inner end portions, substantially U-shaped guides on the outer ends of said supporting members, a bar extending between the reversed inner end portions of the supporting members and secured thereto, end members hingedly mounted on the ends of said bar for swinging movement in a horizontal plane, said end members comprising substantially reversed free end portions engageable in the guides, and springs mounted on the reversed inner end portions of the supporting members and connected to said end members for yieldingly urging the same into engagement with the guides.

JOSEPH CALABRO.